(12) United States Patent
Chrysanthakopoulos

(10) Patent No.: US 8,036,468 B2
(45) Date of Patent: Oct. 11, 2011

(54) INVARIANT VISUAL SCENE AND OBJECT RECOGNITION

(75) Inventor: Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 11/963,858

(22) Filed: Dec. 24, 2007

(65) Prior Publication Data

US 2009/0161968 A1    Jun. 25, 2009

(51) Int. Cl.
*G06K 9/34* (2006.01)
*G06K 9/46* (2006.01)

(52) U.S. Cl. ................. 382/225; 382/173; 382/190

(58) Field of Classification Search .............. 382/181, 382/103, 190, 173, 232, 243, 224, 228, 209, 382/217, 218, 100, 195, 199, 276, 293, 296, 382/107, 192, 286, 289, 128, 186, 108, 254, 382/275, 168, 171, 278, 294, 225; 358/400, 358/443, 448, 462; 367/88; 356/27, 28; 257/E21.53, E21.001, E21.529
See application file for complete search history.

(56) References Cited

U.S. PATENT DOCUMENTS

| | | | |
|---|---|---|---|
| 5,093,869 A | | 3/1992 | Alves et al. |
| 5,650,828 A | * | 7/1997 | Lee .............................. 348/625 |
| 5,740,268 A | | 4/1998 | Nishikawa et al. |
| 5,751,831 A | | 5/1998 | Ono |
| 5,825,922 A | | 10/1998 | Pearson et al. |
| 6,094,508 A | | 7/2000 | Acharya et al. |
| 6,151,424 A | * | 11/2000 | Hsu .............................. 382/294 |
| 6,516,099 B1 | * | 2/2003 | Davison et al. .............. 382/284 |
| 6,647,131 B1 | | 11/2003 | Bradski |
| 6,694,049 B1 | | 2/2004 | Woodall |
| 6,711,293 B1 | | 3/2004 | Lowe |
| 7,239,740 B1 | | 7/2007 | Fujieda |
| 7,376,246 B2 | * | 5/2008 | Shao et al. .................... 382/103 |
| 2002/0168091 A1 | | 11/2002 | Trajkovic |
| 2005/0152603 A1 | | 7/2005 | Bober |

FOREIGN PATENT DOCUMENTS

WO    WO 9724693 A1    7/1997
WO    WO 2005038700 A1   4/2005

OTHER PUBLICATIONS

PCT Notification of Transmittal of International Search Report and Written Opinion for Serial No. PCT/US2008/087866, filed Dec. 20, 2008.
Bichsel M., "Illumination Invariant Object Recognition", Date: 1995, vol. 3, pp. 620-623.
Keil, et al., "Gradient Representation and Perception in the Early Visual System—a Novel Account of Mach band Formation", Date: 2005, pp. 2659-2674.

* cited by examiner

*Primary Examiner* — Sheela Chawan
(74) *Attorney, Agent, or Firm* — Westman Champlin & Kelly PA

(57) ABSTRACT

A method for performing image recognition is disclosed. The method includes obtaining a collection of pixels and grouping at least some of the pixels into a set of cluster features based on gradient magnitude. For each cluster feature in the set, statistical variables are generated. The statistical variables represent a collective property of the pixels in the cluster feature. The statistical variables are utilized as a basis for comparing the collection of pixels to a different collection of pixels.

20 Claims, 5 Drawing Sheets

INVARIANT VISUAL SCENE AND OBJECT RECOGNITION

BACKGROUND

Computer vision is an area of science and technology related to artificial systems that obtain information from captured images. The image data can take many forms including, but certainly not limited to, a video sequence or views from one or more cameras.

The general category of computer vision comprises a variety of different subfields. Object recognition is a subfield of computer vision that involves recognizing objects from image data, for example, determining which of a plurality of images includes an object most similar to an object included in a target image. Another subfield is scene recognition, which involves recognizing a scene from image data, for example, determining which of a plurality of images includes a scene most similar to an object included in a target image. Computer vision is often utilized as a basis for automating a variety of practical applications including, but certainly not limited to, autonomous robot navigation and unsupervised security functions. For example, robot and security systems can be configured to initiate a particular response when a particular object or scene is automatically detected and identified.

Currently, there are systems that support a broad range of recognition-oriented computer vision tasks including automated scene and object recognition. While some of these systems may perform recognition tasks with a reasonable degree of accuracy, performance is not always an efficient endeavor, especially in terms of the required computer processing and/or memory resources. Further, many existing systems are not effective in terms of providing invariant image recognition.

The discussion above is merely provided for general background information and is not intended for use as an aid in determining the scope of the claimed subject matter.

SUMMARY

Embodiments of a method for performing image recognition are disclosed. In one embodiment, a method includes obtaining a collection of pixels and grouping at least some of the pixels into a set of cluster features based on gradient magnitude. For each cluster feature in the set, statistical variables are generated. The statistical variables represent a collective property of the pixels in the cluster feature. The statistical variables are utilized as a basis for comparing the collection of pixels to a different collection of pixels.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

The present invention relates to methods for improving the performance and reliability of computer vision systems, especially image recognition systems. While this detailed description may discuss systems and methods in the context of object and/or scene recognition systems, it is to be understood that the same or similar concepts could just as easily be applied within other types of computer vision systems.

Figure 1:
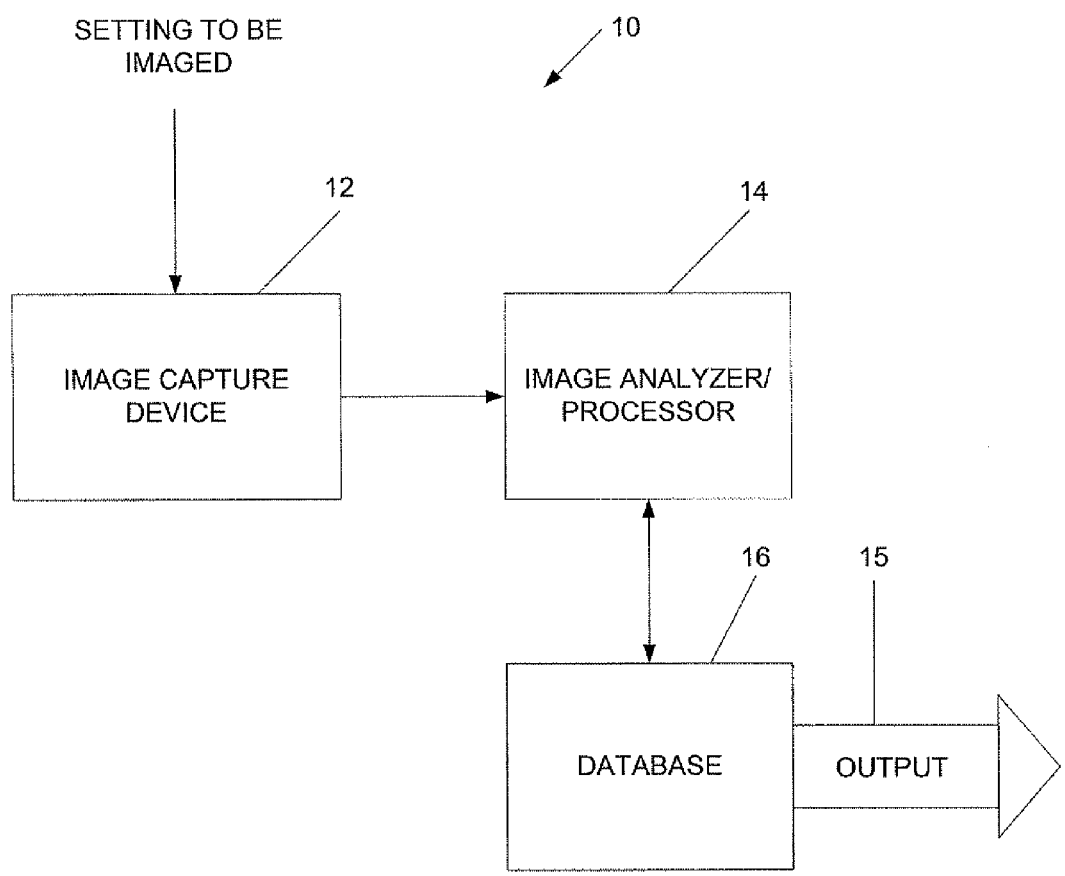
FIG. 1 is a block diagram of an image recognition system.

FIG. 1 is a block diagram of an image recognition system 10 within which embodiments of the present invention can be implemented. System 10 is only one example of a suitable system and is not intended to suggest any limitation as to the scope of use or functionality of the claimed subject matter. Neither should system 10 be interpreted as having any dependency or requirement relating to any one or combination of illustrated components.

Image recognition system 10, which is of course a simplified representation, includes an image capture device 12, an image analyzer/processor 14, a database 16, and an output 15. Image capture device 12 can be any camera or other system component capable of capturing an image and transferring corresponding data to an image analyzer, such as image analyzer/processor 14. The captured images can include isolated images or can be more in the nature of video images. Further, without departing from the scope of the present invention, device 12 can just as easily include multiple devices, for example, multiple devices that capture multiple image perspectives of the same scene or object.

In one embodiment, device 12 includes an imager that receives, through a system of optics, a visual representation of the scene or object to be imaged. The imager produces an analog image signal indicative of the received visual representation. The analog signal is transferred to a analog/digital converter, which produces a digital representation of the analog signal. The digital signal is reformatted into a digitized image that can be stored and manipulated. It is illustratively this digitized image that is transferred to image analyzer/processor 14.

In one embodiment of the present invention, as will be discussed in more detail below, image analyzer/processor 14 generates data indicative of features and characteristics of images received from image capture device 12. In one embodiment, this data is utilized as a basis for efficiently comparing a received image with one or more different, previously obtained images that are represented within database 16. Output 15 is illustratively a result or outcome of the comparison process. The precise nature of output 15 will depend on the particular context within which system 10 is to be applied. For instance, output 15 could be an indication of a positive or negative comparison outcome. Alternatively, output 15 could identify a particular image or images in database 16 that are most similar or similar enough to surpass a match threshold. These are but examples of the many potential forms of output 15.

At this point, it is also worth mentioning the concept of invariance. It is logical that, from one capture of an image to the next, there will be inconsistency, for example, in terms of perspective, orientation, lighting, etc. If system 10 requires, for a match to be declared, an exact or substantial recreation of the environment in which a previous image was captured, then system 10 is not very robust and may have little or no practical utility. As will be described in greater detail below, matching processes and algorithms described herein are relatively efficient but are also effective in terms of being able to support relatively invariant image recognition.

There are a variety of practical applications that benefit from image recognition functionality such as is provided by system 10. In one of many examples, system 10 can be implemented so as to enable a mobile robot to utilize computer vision to recognize whether its current environs are familiar relative to a database of images of previously experienced environs. As the robot moves around, it illustratively snaps pictures of its environment and then tags the photographs with an identifier, which may be a computer generated string of characters but alternatively may be a word or phrase that serves as a more human-friendly identification aid. In this manner, the robot is able to utilize comparison output to support some degree of artificial intelligence, for example, to localize position (e.g., this location is the kitchen, etc.) or identify an object from a scene (e.g., that object is a chair, etc.). This vision-based approach is especially beneficial in environments where other technologies, such as GPS (Global Positioning System) technology, are not available. Further, utilizing a vision-based approach is relatively inexpensive as compared to most other technologies that enable location identification. Those skilled in the art will appreciate that a mobile robot application is but one of many examples of an applicable practical application.

Figure 2:
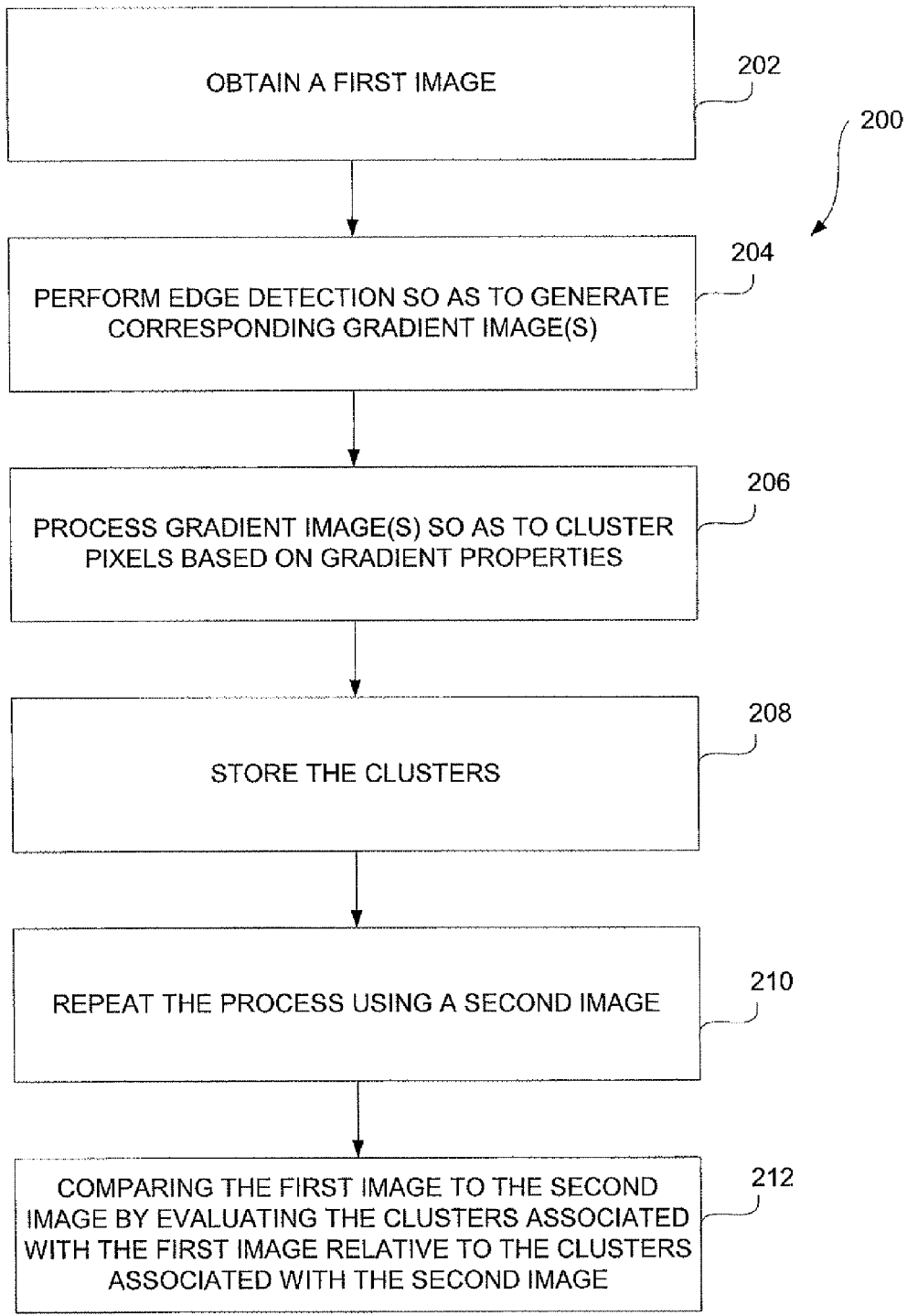
FIG. 2 is a flow chart diagram of an image comparison process.

FIG. 2 is a flow chart diagram providing a simplified presentation of an image comparison process 200. Process 200 is illustratively computer-implemented. In one embodiment, process 200 is carried out by a computer-implemented image analyzer/processor (e.g., 14 in FIG. 1). In accordance with block 202, process 200 begins simply by obtaining a first image. It is not required that this image be contemporaneously captured. Nor is it required that the image be obtained directly from an image capture device. The image can originate from any source such as, but not limited to, a camera, a desktop, the Internet (e.g., the Web), a disk, or a scanner.

In one embodiment, there are few or no restrictions placed upon the parameters of the obtained image. For example, there is illustratively no required resolution (e.g., 320×240, 640×480 etc.). There is illustratively no required color depth. The image can illustratively be monochrome. Notably, the image does not have to represent a real scene. The image can be, for example, a visualization aid, a simulated environment or even a graph. As will become apparent, process 200 can essentially be utilized to compare any collection of pixels to another collection of pixels.

In accordance with step 204, an edge detection process is applied to the obtained image. Those skilled in the art will appreciate that there are a variety of different methods that can be utilized for edge detection. The present invention is not limited to any one method in particular. In one embodiment, edge detection is accomplished utilizing an application of the Sobel coefficient so as to calculate the gradient of image intensity at each point (e.g., each pixel).

In another embodiment, edge detection is accomplished utilizing an application of a simple 1D gradient vector for X and Y (−1,0,1). In this case, a single convolution is applied over each pixel in the image so as to produce a representation of the image that amplifies gradients. This process is illustratively parametric on the convolution kernal.

One way to conceptualize this latter edge detection process is to imagine a sliding window that passes over the array of pixels (i.e., the image). The window is illustratively 3 pixels by 3 pixels, though the convolution could just as easily be otherwise sized, for example, 5×5 pixels. Starting from an arbitrary point within the image (e.g., top left) 3×3 sections of the image are taken and the convolution is applied. For example, the 3×3 pixels are illustratively multiplied by −1, 0 and 1 in the horizontal direction. At the same time, they are multiplied by −1, 0 and 1 in the vertical direction. Thus, the process essentially begins with a 3×3 matrix and, following the described processing, a corresponding 3×3 matrix is produced. The result is essentially gradient extraction. A new image the same size as the original image but now with emphasized edges is produced. Again, the scope of the present invention is not limited to any one edge detection method in particular. Those skilled in the art will appreciate there are multiple known alternatives.

Those skilled in the art will also appreciate that most images are essentially three images overlaid on each other—a red pixel matrix, a blue pixel matrix and a green pixel matrix. In one embodiment, the gradient is run for each color channel (e.g., gradient algorithm is run in the red channel, then run in the blue channel, and then in the green channel). Each one of the individual gradient images can essentially be thought of as a separate monochrome image (e.g., the red gradient, the blue gradient and the green gradient). The three resulting gradient images are illustratively laid over one another to form a combined, single gradient image. To the extent that the terminology "gradient image" is utilized within the present description, it is to be understood that this can include data collectively associated with the different color channels.

It is worth mentioning that embodiments of the present invention could just as easily be applied to images in color spaces other than RGB (red, green, blue). For example, embodiments can be applied to images in the YcbCr color space, which is another 3 channel encoding of colored images. In the YcbCr color space, gradients are typically strongest strong on the Y channel and, relative to RGB, there is improved color and lighting color invariance. This is but one example of another color space within which embodiments of the present invention may be applied. The scope of the present invention is not limited to the examples provided herein, and is not limited to 3 channel encoding schemes.

Within the gradient image, edges are clearly distinguishable. For example, an image of a vertical corner of a wall is likely to produce, in the corresponding gradient image, high magnitude pixels along the edge of the corner (i.e., a relatively strong line). Of course, high magnitude pixels are can appear within the gradient image in some or all of the different color channels.

In one embodiment, a dictionary (e.g., a hash table) is utilized to create an entry per discrete gradient magnitude value found in the gradient image. In one embodiment, for efficiency, the gradient magnitude is quantized to the nearest integer value (i.e., from the original double precision). In one embodiment, a threshold is selectively applied such that only pixels having a magnitude value above a predetermined value are added to the dictionary. The threshold value is illustratively an adjustable system parameter.

In accordance with block 206, pixels that demonstrate the same (or substantially similar depending on system tolerances) characteristics are essentially clustered. Each entry in the dictionary creates a new "bucket," with each bucket having a unique (or substantially unique depending on system tolerances) magnitude value. In one embodiment, all pixels in the gradient image (or all pixels with a magnitude above a predetermined threshold value) are classified into one of the buckets.

After the entire gradient image is processed, there will be N buckets, indicating how many total pixels per discrete gradient magnitude were found within the scene. In accordance with block 208, the clusters or buckets associated with the first image are stored (e.g., using a textual tag to name the saved image data).

In accordance with block 210, steps 202-208 are repeated relative to a second image. Finally, in accordance with block 212, the similarity of the first image relative to the second image is evaluated based on an evaluation of characteristics of the clusters/buckets associated with the first image relative to characteristics of the clusters/buckets associated with the second image.

In one embodiment, characteristics of the clusters/buckets associated with the first image are evaluated to characteristics of clusters/buckets associated with multiple other images so as to determine which of the multiple images is most similar to the first image. In one embodiment, histograms that indicate which (based in whole or in part on cluster/packet characteristics) of a plurality of stored images (e.g., which scene, object, etc.) is a best match relative to the first image (e.g., relative to a contemporaneously captured image) are generated. In one embodiment, a concurrent comparison algorithm is employed such that multiple stored scenes are compared (based in whole or in part on cluster/packet characteristics) in parallel to a contemporaneously captured scene.

Notably, process 200 does not involve a direct, literal comparison of the first and second images. This is advantageous at least in that images can be compared and deemed matching even if there are significant inconsistencies between the two images. Another way of conceptualizing this is that process 200 effectively supports invariant image recognition. If this were not true, then even if the first and second images were taken from the same camera, the images would be unlikely to be determined to match if the camera was moved even slightly between shots. Or, even if the first and second images were of the same object from opposite perspectives, the images would be unlikely to be determined to match.

It also to be emphasized that there is no requirement that either of the first or second images be contemporaneously captured. The two images can originate from any source such as, but not limited to, a camera, a desktop, the Internet (e.g., the web), a disk, or a scanner. Of course, the images need not originate from the same source. Neither is it required that the images have the same parameters or characteristics in terms of resolution, color, lighting, etc. Process 200 essentially supports a comparison of any first set of pixels to any second set of pixels.

Generally speaking, the theory underlying image comparison process 200 is not focused on the specific location of individual pixels within an image to be compared. Instead, pixels having substantially similar gradients are clustered and, in essence, are collectively treated like an individual feature. A typical image is likely to have some strong edges, some weak edges, and some edges in between. These differences in strength will be reflected in the dispersion of gradients in the corresponding gradient image. Pixels associated with strong edges will be allocated to a different group than pixels associated with weak edges. If all pixels in an image have the same gradient (e.g., as would be the case with an image without edges, such as an image of a flat table surface), then no features will be identified (which in and of itself may be useful information when comparing one image to another).

As an example, one can imagine an image that contains nothing but a series of four identical, vertically oriented black lines over a white background. In general, image comparison process 200 will not focus simply on the location where the black line pixels are located. Instead, the focus will be upon the edges and the fact that there are a large number of pixels with the same strong gradient magnitude. These pixels will be clustered together and considered collectively during the image comparison process.

In one embodiment, the process of allocating the pixels into cluster/bucket features based on gradient magnitude is configured, to some extent, to take pixel position into consideration. For example, a rule can be imposed so as to create, in certain circumstances, multiple cluster/bucket features for a same or similar gradient. For example, it can be desirable to allocate two pixels that have the same gradient but are more than x distance part (wherein x is an adjustable system parameter) into two separate cluster/bucket features. This is an optional way of creating more features for comparison purposes. Of course, the image comparison step (e.g., step 212 in process 200) is illustratively configured to account for and advantageously leverage multiple cluster/buckets having same or similar gradient characteristics when such a scenario exists.

While it is conceivable for image comparisons to be made based simply on the gradient magnitude properties of the cluster/bucket features associated with images to be compared, the accuracy of such comparisons are not likely to be good for all images. For example, an image with four black vertical lines over a white background is likely to be determined to match an image with four similar black but horizontal lines over a white background. It is desirable for the comparison process to be more flexible in circumstances such as these. The present description will now turn to examples of methods for making the comparison process more flexible and robust.

In one embodiment, for each cluster/bucket, rather than maintaining a record of the actual individual physical pixel positions, a broader collective set of gradient characteristics are tracked relative to all of the pixels in the cluster. Those skilled in the art will appreciate that the precise nature of which characteristics are tracked may vary from one application to the next. Any characteristic that supports a comparison of one cluster/bucket feature to another cluster/bucket feature should be considered within the scope of the present invention. It should be noted that the cluster/bucket feature characteristics can be based on values derived from a gradient image and/or a corresponding original image. Further, the characteristics can be average values calculated across pixels represented in a given cluster/bucket feature.

In one embodiment, a feature vector is generated for each cluster/bucket feature. Each feature vector represents collective or average characteristics of the pixels included in the corresponding cluster/bucket. In one embodiment, a feature vector includes several variables averaged based on the pixels within the cluster/bucket. In one embodiment, the variables include any or all of average area (e.g., number of pixels involved in the feature), average position (e.g., centroid), average gradient angle, average gradient magnitude, skew (e.g., on the centroid), standard deviation (e.g., on the centroid) and Kurtosis (e.g., measurement of whether a variable's probability distribution is peaked or flat relative to a normal distribution). The feature vectors are illustratively generated to support the image comparison process.

While cluster/bucket features contain pixels that are similar in magnitude, they may come from different locations within the original image. Thus, when it is desired to compare one image to another, it is not immediately clear how cluster/bucket features from one image should be aligned with cluster/bucket features from the other for comparison purposes (e.g., for the purpose of comparing the variables represented in the feature vectors).

Figure 3:
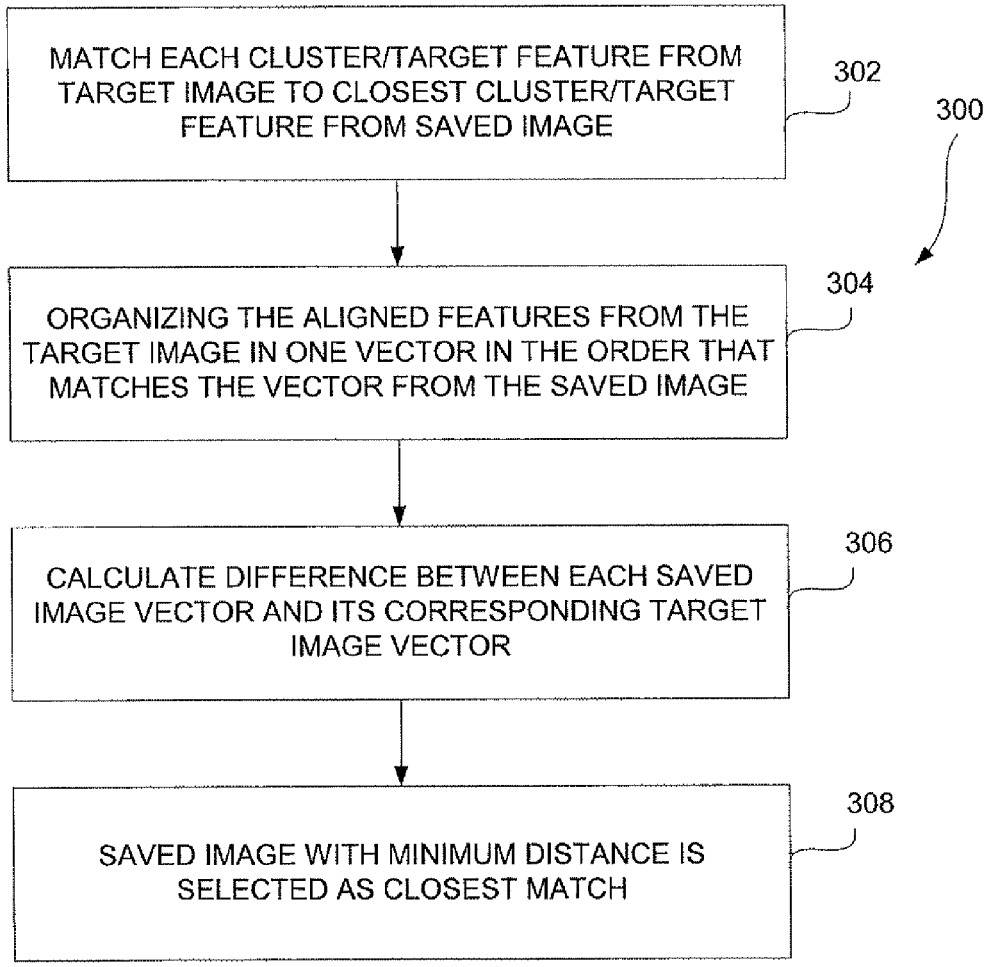
FIG. 3 is a flow chart diagram of an image comparison process.

As an example of a solution to the described alignment dilemma, FIG. 3 is a flow chart diagram demonstrating a process 300 for comparing a first image (hereafter referred to as the "target image" to a plurality of other images (hereafter referred to as "stored images," as in images stored in a database). In one embodiment, process 300 is carried out by a computer-implemented image analyzer/processor (e.g., 14 in FIG. 1). It is illustratively assumed that cluster/bucket features have been generated (and stored) for the target and stored images. It is also illustratively assumed that comparison variables have been generated (and stored) for the cluster/bucket features.

In accordance with block 302, for each saved image, each cluster/bucket feature from the target image is matched to the closest feature in the saved image, for example by comparing variables in the feature vectors. In one embodiment, this is done by taking the Euclidean distance between every feature in the target image and every feature in the saved image, and then taking the one with the minimum distance. As an option, this operation can be configured to impose a weighting scheme such that not all variables are considered equal.

In accordance with block 304, the aligned features from the target image are written out in one large vector in the order that matches the vector from the saved image. In accordance with block 306, a difference is calculated between each saved image vector and its corresponding target image vector. In accordance with block 308, the saved image with the minimum distance is selected as the closest matching image.

Accordingly, a "different" feature vector is calculated for the target image (the order of features is different) to support the comparison to each saved image. This enables one weight matrix to be utilized for all saved images. The order illustratively changes when the target image changes (i.e., due to different alignment). This means generating a different weight vector for each saved image. Training against a set of images gives the highest probability of detection.

Those skilled in the art will appreciate that other comparison algorithms can be utilized without departing from the scope of the present invention. For example, rather than the described flat vector approach, a "point" system can be implemented wherein the closest match is the saved image that scores the most points by having the most matching variables. This is but one of many other possible comparison schemes that should be considered within the scope of the present invention.

At this point, it may be worth elaborating on some of the variables that can be considered in the cluster/bucket feature comparison process. One of the mentioned variables was average gradient angle. In one embodiment, gradient angel is calculated per pixel (and then averaged to support the variable), for example, using the inverse tangent of the vertical gradient magnitude divided by horizontal gradient magnitude, which can also be represented as:

$$A \tan(gradMagY[i]/gradMagX[i]) \qquad \text{Eq. 1}$$

Another variable that can be taken into consideration is average color intensity. As has been described, the allocation of pixels into cluster/bucket features is illustratively conducted for each color channel. One can imagine an image of a table with a green ball in the middle and another image of the same table but with a blue ball in the middle. Though the two images are very similar, the color of the ball is different. During processing, in the red channel, there will be no gradients corresponding to the ball. There will be gradients for the blue ball in the blue channel and the green ball in the green channel. Process 200 detects the differences in color because processing occurs within the different color channels. In one embodiment, for each cluster/bucket, the average color intensity is tracked for each color channel (i.e., the average green intensity, the average blue intensity, and the average red intensity). In one embodiment, the average color intensity is based on the color of the individual pixels within the original image (as opposed to the gradient image).

The standard deviation of a cluster/bucket feature is illustratively an indication of the dispersion of the pixels contained within the feature. For example, the standard deviation might indicate that a particular feature includes pixels from all over the image (i.e., a relatively high standard deviation. In other words, the feature contains pixels that are relatively far apart and scattered. If the standard deviation is small, it means that those pixels are actually grouped together within the image (e.g., bright red pixels forming a ball in the middle of a table).

In one embodiment, an additional measurement used to compare images is the size of the feature vector itself. For example one can imagine an image A has ten cluster/bucket features (i.e., for ten different gradient magnitude values) across all color channels. Each cluster illustratively includes nine variables (gradient, average angle, number of pixels in the cluster, average color, average color std deviation, centroid X, centroid Y, standard deviation x, standard deviation y). The total feature vector that describes image A then has a size of ninety (e.g., 9*10=90). Now, one can image that an image B has thirty cluster/bucket features across all color channels. Its feature vector is then a much larger 300. Despite this difference in vector size, the matching algorithm illustratively will still attempt to match up features from image A with features from image B (notably, the same feature in B can match multiple times to the same feature on A) However, in one embodiment, an additional feature size value is calculated and considered in the matching process. In one embodiment, feature size value is calculated as:

$$FestureSize = fvlA - fvlB/\max(fvlA, fvlC) \qquad \text{Eq. 2}$$

where fvlA is the length of feature vector A, fvlB is the length of feature vector B and fvlC is the length of a feature vector length C. The feature size is illustratively added to the Euclidean distance and calculated between scenes. Accordingly, the larger the discrepancy in total feature vector sizes, the more "distant" the images. Practically speaking, this is a good indicator of relative image complexity (e.g., an image with no gradients will have very few cluster/bucket features, so it can be quickly determined that it will not match well with an image having many gradients and cluster/bucket features).

A given image could contain any number of pixels, possibly even 300,000 or more. The present invention avoids the processing burden of having to analyze large numbers of individual pixel characteristics for image comparison purposes. Instead, a relatively small number of characteristics of cluster/bucket features support the comparison process. An image containing many pixels is reduced down to a small number of cluster/bucket features, for example, ten features per color channel. A small number of tracked variables are then derived for each feature. Thus, this leads to a relatively small number of data points that support accurate and efficient image comparison processing.

Figure 4:
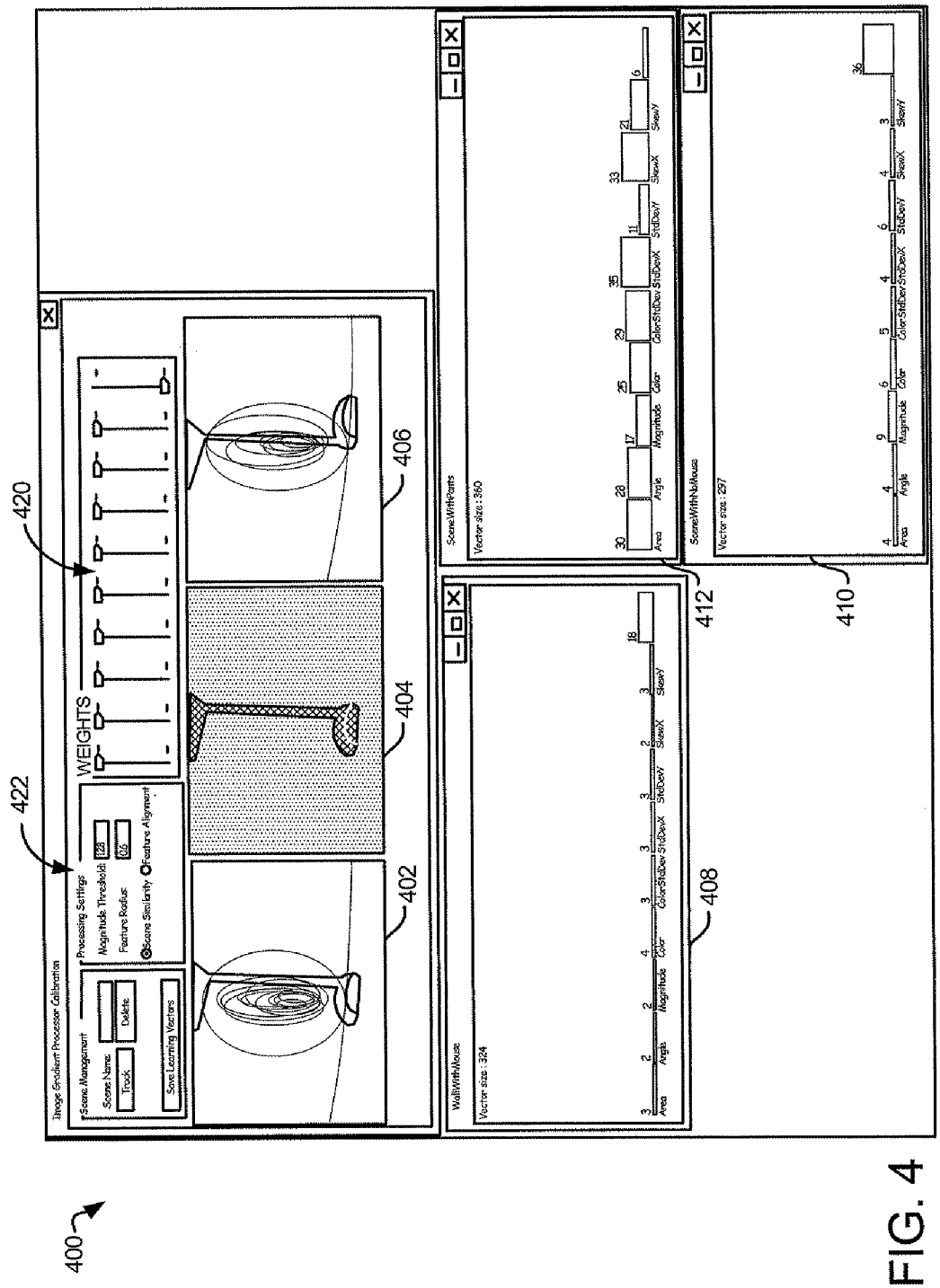
FIG. 4 is an example of user interface associated with an image recognition system.

FIG. 4 is an example user interface 400. Interface 400 shows what a portion of a system applying image comparison processes 200 and 300 might look like from the perspective of a user. It is assumed, for the purpose of illustration only, that the system is being applied so as to compare a contemporaneously obtained target image with a database of saved images.

Data associated with the results of comparing the target image to three different saved images (e.g., the three closest matches in the database) is included in FIG. 4. Boxes 402, 404 and 406 each contain a representation of a gradient image associated with one of the three images (one gradient image per saved image). Boxes 408, 410 and 412 each contain a graphical representation of statistics derived during the process of comparing the three images to the target image (one set of statistics per saved image).

Each of boxes 408, 410 and 412 includes a chart with ten different bars. Each of the first nine bars is labeled with a different feature variable, each feature variable being a characteristic of a cluster/bucket feature. In particular, the nine characteristics include area (e.g., number of pixels included in feature), angle (e.g., average gradient angle across pixels in feature), magnitude (e.g., average magnitude of pixels in feature), color (e.g., average color of pixels in feature), color standard deviation, standard deviation relative to X axis, standard deviation relative to Y axis, skew relative to X axis, and skew relative to Y axis.

Within each of boxes 408, 410 and 412, for each of the nine characteristics, an error value is provided along with a bar representation of that value. The error value illustratively represents, for that characteristic, the error generated when the associated stored image is compared to the target image (e.g., compared in accordance with an algorithm for optimizing alignment of cluster/bucket features, such as process described in association with FIG. 3). The higher the bar (i.e., the larger the error value), the more error there was for the stored image as compared to the target image.

Accordingly, the image that most closely matches the target scene will be the image with the smallest bars (i.e., smallest errors). In the case of the example shown in FIG. 4, the target scene is closest to the saved image associated with box 408 (i.e., the scene named "WallWithMouse"). It should be noted that the tenth value/bar included in each of boxes 408, 410 and 412 represents the difference in the number of cluster/bucket features between the current scene and each of the saved scene.

User interface 400 includes an area 420 that includes a collection of controls. The controls illustratively enable a user to manipulate the feature characteristics/variables (e.g., the ten variables noted in boxes 408, 410 and 412) such that they are not necessarily given equal weight in the comparison processing. User interface 400 also includes an area 422 wherein a user can selectively impose a magnitude threshold (e.g., a minimum gradient threshold to be imposed upon the process of forming cluster/bucket features). Area 422 also enables a user to impose a requirement related to feature radius. Of course, those skilled in the art will appreciate that interface 400 is but one of many examples of how controls and data presentation might be presented to a user. Other control and/or data presentation arrangements are certainly within the scope of the present invention.

Figure 5:
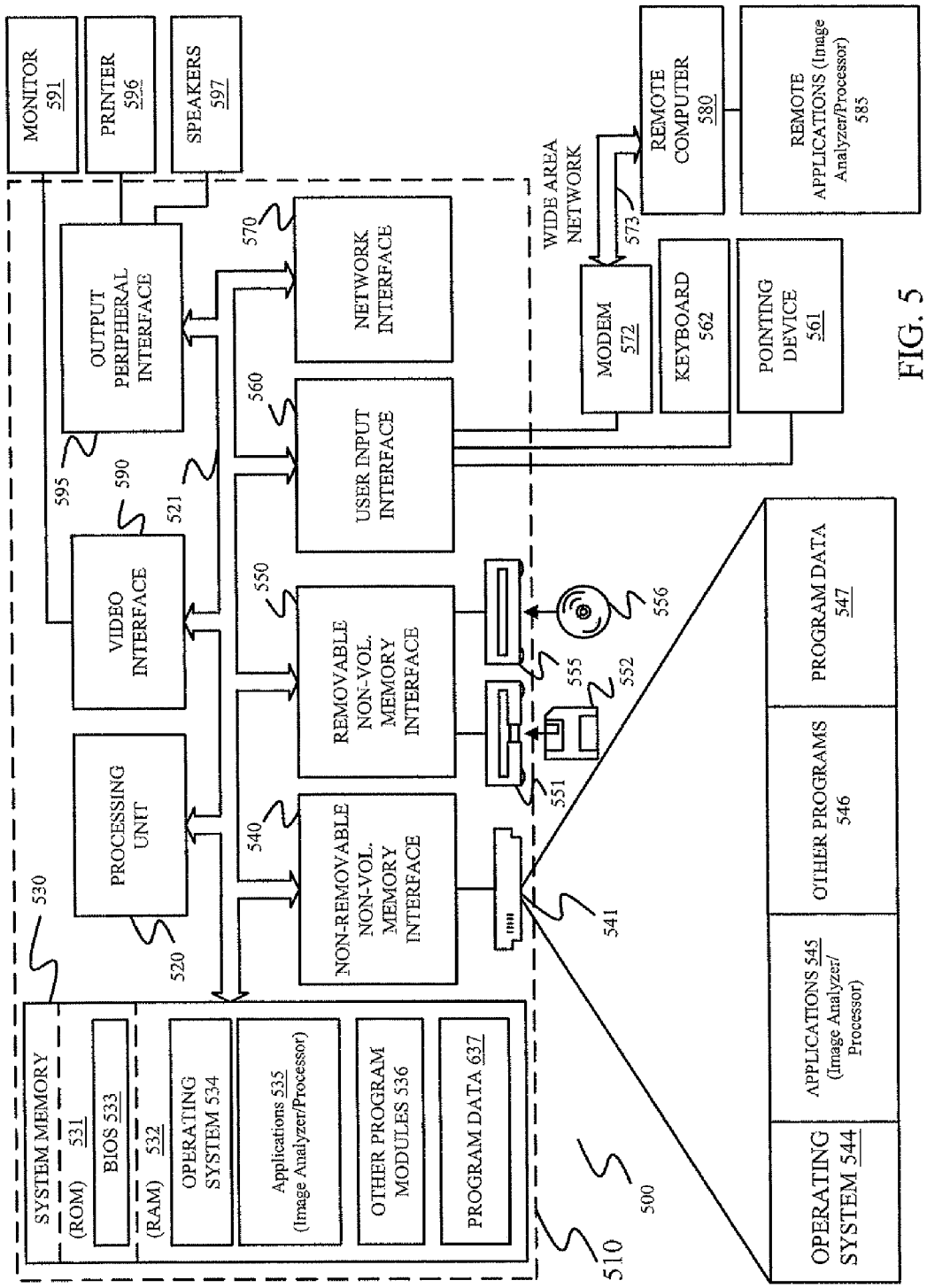
FIG. 5 illustrates an example of a computing system environment.

FIG. 5 illustrates an example of a suitable computing system environment 500 in which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments have been described herein in the general context of computer-executable instructions, such as program modules, being executed by a computer. Generally, program modules include routines, programs, objects, components, data structures, etc. that perform particular tasks or implement particular abstract data types. Embodiments can be practiced in distributed computing environments where tasks are performed by remote processing devices that are linked through a communications network. In a distributed computing environment, program modules can be located on both (or either) local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520.

Computer 510 typically includes a variety of computer readable media. Computer readable media can be any available media that can be accessed by computer 510 and includes both volatile and nonvolatile media removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537. Applications 535 are shown as including an image analyzer/processor, which can be an analyzer/processor that implements functionality that same or similar to processes 200 and 300. This is but one example of a possible implementation of embodiments of the present invention in the context of a computing system.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. Applications 545 are shown as including an image analyzer/processor, which can be an analyzer/processor that implements functionality that same or similar to processes 200 and 300. This is but one example of a possible implementation of embodiments of the present invention in the context of a computing system.

A user may enter commands and information into the computer 510 through input devices such as a keyboard 562 and a pointing device 561, such as a mouse, trackball or touch pad. Other input devices (not shown) may include a joystick, game pad, microphone, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The logical connection depicted in FIG. 5 is a wide area network (WAN) 573, but may also or instead include other networks. Computer 510 includes a modem 572 or other means for establishing communications over the WAN 573, such as the Internet. The modem 572, which may be internal or external, may be connected to the system bus 521 via the user-input interface 560, or other appropriate mechanism. Remote computer 580 is shown as operating remote applications 585. Applications 585 are shown as including an image analyzer/processor, which can be an analyzer/processor that implements functionality that same or similar to processes 200 and 300. This is but one example of a possible implementation of embodiments of the present invention in the context of a computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented image processing method, the method comprising:
   generating a collection of gradient data associated with a first image;
   assigning pixels within the first image into a set of cluster features based on gradient magnitude as reflected in the collection of gradient data; and
   storing the set of cluster features.

2. The method of claim 1, wherein assigning comprises assigning pixels such that the pixels in a given cluster feature have a same or substantially similar gradient magnitude.

3. The method of claim 1, further comprising:
   generating a second collection of gradient data associated with a second image;
   assigning pixels within the second image into a second set of cluster features based on gradient magnitude as reflected in the second collection of gradient data; and
   storing the second set of cluster features.

4. The method of claim 3, further comprising comparing the first image to the second image by evaluating the first set of cluster features relative to the second set of cluster features.

5. The method of claim 4, wherein evaluating the first set of cluster features relative to the second set of cluster features comprises evaluating a first statistical variable to a second statistical variable, wherein the first statistical variable is indicative of a property of pixels included in a first cluster feature that is part of the first set of cluster features, and wherein the second statistical variable is indicative of a property of pixels included in a first cluster feature that is part of the second set of cluster features.

6. The method of claim 5, wherein the first statistical variable is indicative of a property that is calculated by determining an average across all pixels in the first cluster feature.

7. The method of claim 3, wherein comparing the first image to the second image comprises aligning cluster features in the first set with cluster features in the second set based on similarity of the cluster features.

8. The method of claim 1, further comprising, for each cluster feature in the set, calculating and storing a set of statistical variables that are indicative of properties of pixels included in the cluster feature.

9. The method of claim 8, wherein the set of statistical variables includes an area variable indicative of the number of pixels in the cluster feature.

10. The method of claim 8, wherein the set of statistical variables includes a variable indicative of a relative position of pixels in the cluster feature.

11. The method of claim 8, wherein the set of statistical variables includes an average gradient angle variable that is collectively indicative of pixels within the cluster feature.

12. The method of claim 8, wherein the set of statistical variables includes a skew variable.

13. The method of claim 8, wherein the set of statistical variables includes a standard deviation variable.

14. A computer-implemented method for performing image recognition, the method comprising:

obtaining a collection of pixels;

grouping at least some of the pixels in the collection into a set of cluster features based on gradient magnitude;

for each cluster feature in the set, generating statistical variables that represent a collective property of the pixels in the cluster feature; and utilizing the statistical variables as a basis for comparing the collection of pixels to a different collection of pixels.

15. The method of claim 14, wherein utilizing the statistical variables comprises comparing cluster features in the set to cluster features in a different set associated with the different collection of pixels.

16. The method of claim 14, wherein generating statistical variables comprises generating an average color of pixels included in the cluster feature.

17. The method of claim 14, wherein generating statistical variables comprises generating an average position of pixels included in the cluster feature.

18. The method of claim 14, wherein generating statistical variables comprises generating a number of pixels included in the cluster feature.

19. A computer-implemented method for performing image recognition, the method comprising determining the relative similarity of a first image to a second image, wherein determining comprises comparing cluster features associated with the first image to cluster features associated with the second image, and wherein the cluster features associated with the first and second images are derived based on pixels that have been grouped together based on gradient magnitude.

20. The method of claim 19, wherein determining further comprises comparing the number of cluster features associated with the first image to the number of cluster features associated with the second image.

* * * * *